United States Patent Office 3,840,539
Patented Oct. 8, 1974

3,840,539
PHTHALAZINE DERIVATIVES
Katsujiro Ueno, Seiichi Miyazaki, and Akira Akashi, Tokyo, Japan, assignors to Daiichi Seiyaku Company, Ltd., Tokyo, Japan
No Drawing. Filed Sept. 2, 1971, Ser. No. 177,488
Claims priority, application Japan, Sept. 14, 1970, 45/80,659
Int. Cl. C07d 51/06
U.S. Cl. 260—250 P    9 Claims

ABSTRACT OF THE DISCLOSURE

Alkenylidene hydrazinophthalazine derivatives, represented by the general formula:

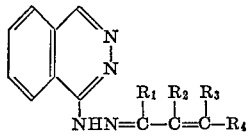

wherein $R_1$, $R_2$, $R_3$ and $R_4$ each represent a hydrogen atom or a lower alkyl group, are prepared by reacting 1-hydrazinophthalazine with an $\alpha,\beta$-unsaturated aliphatic aldehyde or an $\alpha,\beta$-unsaturated aliphatic ketone of the formula:

  (II)

wherein $R_1$, $R_2$, $R_3$ and $R_4$ are defined as above. The compounds are useful as antihypertensive agents.

BACKGROUND OF THE INVENTION

Field of the Invention

The present invention relates to novel phthalazine derivatives and to processes for preparing the same. More particularly, this invention relates to novel alkenylidene hydrozinophthalazine derivatives represented by the general formula (I).

Description of Prior Art

Hydralazine (1-hydrazinophthalazine) has been used in the treatment of hypertension. This compound, however, frequently has demonstrated undesirable side-effects and hence is not satisfactory for clinical use.

Many hydrazones formed by reaction of hydralazine with a saturated carbonyl compound have also been synthesized and their antihypertensive effects noted (Emil Schlittler, *Antihypertensive Agents*, pages 227–229 (1967)). These hydrazones, however, also exhibit undesirable side-effects or undesirably low activity and likewise are not satisfactory for clinical application.

SUMMARY OF THE INVENTION

Accordingly, it is one object of this invention to provide vide an antihypertensive agent which can be safely used clinically without deleterious side-effects.

This and other objects have now herein been provided by the alkenylidene hydrozinophthalazine having the formula (I) above.

DETAILED DESCRIPTION OF THE INVENTION

The compounds of this invention can be prepared by reacting 1-hydrazinophthalazine having the formula:

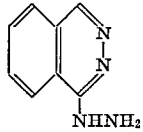

or a salt thereof, with an $\alpha,\beta$-unsaturated aliphatic aldehyde or an $\alpha,\beta$-unsaturated aliphatic ketone, having the formula:

  (II)

wherein $R_1$, $R_2$, $R_3$ and $R_4$ each represent a hydrogen atom or a lower alkyl group.

The reaction may be generally carried out in a suitable solvent, such as methanol, ethanol or dioxane, at a temperature of between room temperature and 100° C.

The desired compounds may be isolated from the reaction mixture in the form of a free base or an acid addition salt. Either can be converted into the other form by conventional methods.

The compounds of the invention have the characteristic double bond conjugated with a hydrazone bond, and show reliable antihypertensive effects and a very favorable degree of activity, ordinarily not obtained by analogous hydralazines which are among the better known antihypertensive drugs, or the like.

To demonstrate this, the pharmacological properties of 1-(2-methyl-2-butenylidene)hydrazinophthalazine ($R_1=R_3=H$, $R_2=R_4=CH_3$ in formula (I)), referred to hereinafter as buteralazine, were compared with those of hydralazine and 1-isopropylidene-hydrazinophthalazine.

Administration was made intravenously in the form of the hydrochloride of buteralazine and orally as a free base.

(I) Antihypertensive effect by single oral administration and acute toxicity

Experimentally renal hypertensive rats were prepared essentially according to the method of Goldblatt, et al. (*Journal of Experimental Medicine*, 59 347 (1934)). The test compounds were administered orally to the animals in single doses.

ED 30 mm. Hg value, the dose which is estimated to produce a 30 mm. Hg fall in blood pressure of the animals, was determined for each test compound.

On the other hand, the oral $LD_{50}$ value was determined in mice and rats.

The results are shown in Table 1.

TABLE 1. — ANTIHYPERTENSIVE ACTIVITIES AND ACUTE TOXICITY

| | ED 30 mm. Hg (mg./kg., p.o.) in rats | $LD_{50}$ (g./kg., p.o.) in— | |
|---|---|---|---|
| | | Mice | Rats |
| Hydralazine | 2.8 | 0.25 | 0.25 |
| Buteralazine | 32 | 3 | 2.5 |

This data indicates that buteralazine is less toxic than hydralazine, although the former demonstrates lower antihypertensive activities.

However, it should be noted that a sudden fall in blood pressure occurs immediately after hydralazine or the like is administered, whereas the compounds of this invention produce only a gradual fall. That is, the maximum fall in blood pressure with hydralazine or 1-isopropylidene-hydrazinophthalazine appeared within 30 minutes after administration, whereas the maximum did not occur until 3 to 4 hours after administration of buteralazine.

This property of buteralazine is expected to reduce dizziness or other unpleasant side-effects which have often been observed in the therapy with hydralazine, known as hydralazine syndrome.

(II) Antihypertensive effects by repeated oral administration

When hydralazine was administered to the experimentally renal hypertensive rats in a dose of 5 mg./kg., two times daily for 5 days, the reduced blood pressure fluctuated within a range of about 50 mm. Hg during the medication period. In contrast with hydralazine, the fluctuation range of buteralazine was not so wide (only about 25 mm. Hg) when administered in equipotent doses (40 mg./kg. X 2 times daily for 5 days).

These experimental results indicate that the activity of buteralazine is longer lasting than that of hydralazine.

In addition, buteralazine proved to show antihypertensive effects not only in experimentally hypertensive rats, but also in spontaneously hypertensive rats. This fact suggests that the compound would be effective on essential hypertension in humans.

(III) Influence on the heart rate

Hydralazine has been known to cause tachycardia, an undesirable side-effect, when used in patients.

In this connection, comparison was made of the influence of hydralazine and buteralazine on the heart rate in non-anesthetized rats. Oral administration of 2.8 mg./kg. of hydralazine produced a 30% increase in the heart rate, whereas only 14% increase was observed with 32 mg./kg. of buteralazine.

Likewise, in the case of intravenous injection, the extent of the heart rate increase when buteralazine was administered was far less than that of hydralazine, i.e., 19% even with 16 mg./kg. dose of buteralazine in contrast to 46% with 0.33 mg./kg. dose of hydralazine.

As described above, the compounds of this invention are useful antihypertensive agents which are characterized by a reliable degree of activity and less side-effects than prior art compounds.

Having generally described the preparation of the compounds of this invention, a more complete understanding can be obtained by reference to certain specific examples which are provided herein for purposes of illustration only and are not intended to be limiting unless otherwise specified.

EXAMPLE 1

A mixture of 1.6 g. of 1-hydrazinophthalazine, 1.0 g. of crotone aldehyde and 50 ml. of methanol, was refluxed for 2 hours. The reaction mixture was concentrated and the residue was dissolved in benzene. The benzene solution was passed through a comparatively short column of alumina and the solvent was removed. The resulting residue was crystallized from ether to give 1.3 g. (61%) of 1-(2-butenylidene)-hydrazinophthalazine. m.p. 117–118° C.

Analysis.—Calcd. for $C_2H_{12}N_4$: C, 67.90; H, 5.70; N, 26.40. Found: C, 68.14; H, 5.79; N, 26.12.

EXAMPLE 2

A mixture of 8.0 g. of 1-hydrazinophthalazine, 6.3 g. of 2-methyl-2-butene-1-al and 250 ml. of methanol, was refluxed for 3 hours. The reaction mixture was concentrated and the residue was crystallized from isopropylether to give 7.9 g. (70%) of 1-(2-methyl-2-butenylidene)hydrazinophthalazine, m.p. 146–148° C.

Analysis.—Calcd. for $C_{13}H_{14}N_4$: C, 69.00; H, 6.24; N, 24.76. Found: C, 68.71; H, 6.23; N, 25.07.

EXAMPLE 3

A mixture of 29.4 g. of 1-hydrazinophthalazine hydrochloride, 15.1 g. of 2-methyl-2-butene-1-al and 800 ml. of methanol, was refluxed for 2 hours. The reaction mixture was concentrated in vacuo to precipitate crystals. The crystals were collected by filtration, recrystallized from methanol and dried at 90° C. in vacuo to give 31.5 g. (80%) of 1-(2-methyl-2-butenylidene)hydrazinophthalazine hydrochloride. m.p. 210° C. (decomposed).

Analysis.—Calcd. for $C_{13}H_{14}N_4 \cdot HCl$: C, 59.42; H, 5.75; N, 21.33; Cl, 13.50. Found: C, 59.23; H, 5.60; N, 21.63; Cl, 13.74.

EXAMPLE 4

A mixture of 2.0 g. of 1-hydrazinophthalazine hydrochloride, 1.1 g. of mesityl oxide (isopropylideneacetone) and 100 ml. of ethanol, was refluxed for 3 hours. The reaction mixture was concentrated in vacuo and the residue was dissolved in water. The water solution was neutralized with sodium bicarbonate, salted out and the product was extracted with benzene. The benzene layer was passed through a comparatively short column of alumina and the solvent was removed. The residue was crystallized from ether to give 0.7 g. of 1-(1,3-dimethyl-2-butenylidene) hydrazinophthalazine. m.p. 131–132° C.

Analysis.—Calcd. for $C_{14}H_{16}N_4$: C, 69.97; H, 6.71; N, 23.32. Found: C, 70.20; H, 6.24; N, 23.29.

EXAMPLE 5

A mixture of 1.6 g. of 1-hydrazinophthalazine, 2.0 g. of 2-methyl-2-n-pentene-1-al and 100 ml. of methanol, was refluxed for 2 hours. The reaction mixture was concentrated and the residue was crystallized from ether to give 1.4 g. (60%) of 1-(2-methyl-2-n-pentenylidene)hydrazinophthalazine, m.p. 84–85° C.

Analysis.—Calcd. for $C_{14}H_{16}N_4$: C, 69.97; H, 6.71; N, 23.32. Found: C, 70.11; H, 6.65; N, 23.50.

EXAMPLE 6

A mixture of 1.6 g. of 1-hydrazinophthalazine, 2.0 g. of 2-ethyl-2-butene-1-al and 100 ml. of methanol, was refluxed for 2 hours. The reaction mixture was concentrated, and the residue was crystallized from ether to give 1.5 g. (60%) of 1-(2-ethyl-2-butenylidene)-hydrazinophthalazine. m.p. 123–124° C.

Analysis.—Calcd. for $C_{14}H_{16}N_4$: C, 69.97; H, 6.71; N, 23.32. Found: C, 70.28; H, 6.51; N, 23.28.

EXAMPLE 7

A mixture of 1.6 g. of 1-hydrazinophthalazine, 1.4 g. of methacrolein and 100 ml. of methanol, was refluxed for 2 hours. The reaction mixture was concentrated to dryness and the residue was crystallized from ether-petroleum ether to give 0.8 g. of 1-(2-methylpropenylidene)-hydrazinophthalazine. m.p. 124–125° C.

Analysis.—Calcd. for $C_{12}H_{12}N_4$: C, 67.90; H, 5.70; N, 26.40. Found: C, 67.92; H, 5.70; N, 26.26.

EXAMPLE 8

A mixture of 1.6 g. of 1-hydrazinophthalazine, 1.7 g. of ethacrolein and 100 ml. of ethanol, was refluxed for 2 hours. The reaction mixture was concentrated to dryness and the residue was crystallized from ether-petroleum ether to give 0.9 g. of 1-(2-ethylpropenylidene)-hydrazinophthalazine, m.p. 121° C.

Analysis.—Calcd. for $C_{13}H_{14}N_4$: C, 69.00; H, 6.24; N, 24.76. Found: C, 68.85; H, 6.20; N, 25.12.

Having now fully described the invention, it will be apparent to one of ordinary skill in the art that many changes and modifications can be made without departing from the spirit or scope of the invention.

Accordingly,

What is claimed as new and desired to be secured by Letters Patent of the United States is:

1. A compound of the formula:

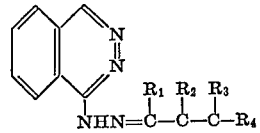

wherein $R_1$, $R_2$, $R_3$ and $R_4$ each represent a hydrogen atom or a lower alkyl group, or the pharmaceutically acceptable salts thereof.

2. The compound of Claim 1, which is 1-(2-methyl-2-butenylidene)-hydrazinophthalazine or its pharmaceutically acceptable salt.

3. The compound of Claim 1, which is 1-(2-butenylidene)hydrazinophthalazine or its pharmaceutically acceptable salt.

4. The compound of Claim 1, which is 1-(1,3-dimethyl-2-butenylidene)hydrazinophthalazine or its pharamaceutically acceptable salt.

5. The compound of Claim 1, which is 1-(2-methyl-2-n-pentenylidene)hydrazinophthalazine or its pharmaceutically acceptable salt.

6. The compound of Claim 1, which is 1-(2-ethyl-2-butenylidene)-hydrazinophthalazine or its pharmaceutically acceptable salt.

7. The compound of Claim 1, which is 1-(2-methylpropenylidene)-hydrazinophthalazine or its pharmaceutically acceptable salt.

8. The compound of Claim 1, which is 1-(2-ethylpropenylidene)-hydrazinophthalazine or its pharmaceutically acceptable salt.

9. A process for preparing novel alkenylidenehydrazinophthalazine represented by the following general formula:

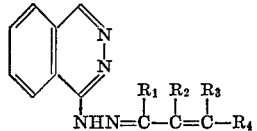

wherein $R_1$, $R_2$, $R_3$ and $R_4$ each represent a hydrogen atom or a lower alkyl group, or salt thereof, which comprises reacting 1-hydrazinophthalazine or its pharmaceutically acceptable salt with a compound of the formula:

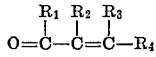

wherein $R_1$, $R_2$, $R_3$ and $R_4$ are as defined above at a temperature of from room temperature to 100° C.

References Cited

UNITED STATES PATENTS 3,422,105  1/1969  Doebel et al. _____ 260—250 A

OTHER REFERENCES

Castle et al.; J. Hetero Chem. vol. 3 pages 381–383 (1966).

Druey et al.: Jour. Medicinal and Pharmaceutical Chemistry, Vol. 1, No. 1 (1959) pages 1–2.

NICHOLAS S. RIZZO, Primary Examiner

U.S. Cl. X.R.

424—250